(12) United States Patent
Wang et al.

(10) Patent No.: US 7,924,951 B2
(45) Date of Patent: Apr. 12, 2011

(54) METHODS AND SYSTEMS FOR DIGITAL WIRELESS COMMUNICATION

(75) Inventors: Xiaodong Wang, New York, NY (US); Kai Li, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 436 days.

(21) Appl. No.: 11/957,409

(22) Filed: Dec. 14, 2007

(65) Prior Publication Data

US 2008/0285666 A1 Nov. 20, 2008

Related U.S. Application Data

(60) Provisional application No. 60/875,417, filed on Dec. 14, 2006.

(51) Int. Cl.
*H04L 27/06* (2006.01)
*H04L 23/02* (2006.01)

(52) U.S. Cl. ........................ 375/341; 375/262

(58) Field of Classification Search ................ 375/260, 375/262, 265, 285, 340–341; 370/210; 714/794–795

See application file for complete search history.

(56) References Cited

U.S. PATENT DOCUMENTS

| | | | |
|---|---|---|---|
| 6,282,168 B1 | 8/2001 | Vijayan et al. | |
| 6,629,287 B1 | 9/2003 | Brink | |
| 6,745,009 B2 | 6/2004 | Raghothaman | |
| 6,873,606 B2 | 3/2005 | Agrawal et al. | |
| 6,952,455 B1 | 10/2005 | Banister | |
| 7,006,804 B1 | 2/2006 | Clark et al. | |
| 7,027,533 B2 * | 4/2006 | Abe et al. | 375/341 |
| 7,076,263 B2 | 7/2006 | Medvedev et al. | |
| 7,180,956 B1 | 2/2007 | Banister | |
| 7,184,773 B2 | 2/2007 | Nagai et al. | |
| 7,212,838 B2 | 5/2007 | Raghothaman | |
| 7,221,956 B2 | 5/2007 | Medvedev et al. | |
| 7,224,758 B1 | 5/2007 | Banister | |
| 7,236,538 B1 | 6/2007 | Banister | |
| 7,236,546 B2 * | 6/2007 | Egnor et al. | 375/341 |
| 7,248,638 B1 | 7/2007 | Banister | |
| 7,593,489 B2 * | 9/2009 | Koshy et al. | 375/340 |
| 7,616,699 B2 * | 11/2009 | Niu et al. | 375/267 |
| 7,751,506 B2 * | 7/2010 | Niu et al. | 375/341 |
| 2003/0215006 A1 | 11/2003 | Ragothaman | |
| 2005/0047517 A1 | 3/2005 | Georgios et al. | |
| 2005/0130694 A1 | 6/2005 | Medvedev et al. | |
| 2005/0255808 A1 | 11/2005 | Nasir et al. | |
| 2007/0076582 A1 | 4/2007 | Tanaka et al. | |
| 2007/0098904 A1 | 5/2007 | Yue et al. | |
| 2007/0191067 A1 | 8/2007 | Nguyen et al. | |

OTHER PUBLICATIONS

"Channel Estimation for Multicarrier Systems". Available at http://www.elet.polimi.it/dsp/tic/ofdm.htm Nov. 30, 2007.
"Latin Supercube Sampling for Very High Dimensional Simulations," ACM Trans. Model. Comput. Simulation, vol. 8, No, 2, pp. 71-102, 1998.
3GPP, R1-062650, Texas Instruments,"Codebook Design for E-ULTRA MIMO Precoding," Oct. 9, 2006.
Ahmed, N. Khojastepour, M. A., Sabharwal, A., and Aazhang, B., "Outage Minimization Feedback for the Fading Relay Channel," IEEE Trans. Commun., vol, 54, No. 4, pp, 659-669, Apr. 2006.

(Continued)

*Primary Examiner* — Khanh C Tran
(74) *Attorney, Agent, or Firm* — Byrne Poh LLP

(57) ABSTRACT

Methods and systems for digital wireless communication are provided.

14 Claims, 2 Drawing Sheets

OTHER PUBLICATIONS

Alamouti, S. M., "A Simple Transmit Diversity Technique for Wireless Communications." IEEE J. Select. Areas Commun., 16(8): 1451-1458, Oct. 1998.

Alspach. D. L. and Sorenson, H. W., "Nonlinear Bayesian Estimation Using the Gaussian Sum Approximation," IEEE Trans. Autom. Control, vol. 17, pp. 439-448, 1972.

Altera, "Implementing OFDM Using Altera Intellectual Property." White Paper, Mar. 2001.

Arulampalam, S., Maskell, S., Gordan, N., and Clapp, T., "A Tutorial on Particle Filter for On-Line Nonlinear/Non-Gaussian Bayesian Tracking," IEEE Trans. Signal Process., vol. 50, No. 2, pp. 174-188, Feb 2002.

Banister, B. C. and Zeidler, J. R., "A Simple Gradient Sign Algorithm for Transmit Antenna Weight Adaption With Feedback", IEEE Trans. On Sign. Proc., vol. 51, No. 5, pp. 1156-1171, May 2003.

Banister, B. C. and Zeidler, J. R., "Feedback Assisted Stochastic Gradient Adaption of Multiantenna Transmisson", IEEE Trans. On Wireless Commun., vol. 4, No. 3, pp. 1121-1135, May 2005.

Banister. B. C. and Zeidler, J. R., "Feedback Assisted Transmission Subspace Tracking for MIMO Systems", IEEE J. on Select. Areas in Commun., vol. 21, No. 3, pp, 452-463, Apr. 2003.

Berrou, Claude, Glavieux, A., and Thitimajshima, P. "Near Shannon Limit Error—Correcting Coding and Decoding: Turbo-Codes (1)," Ecole Nationale Superieure des Telecommunications de Bretagne, France, 1991.

Caire, G., Guemghar, S., Roumy, A., and Verdu, S. "Maximizing the Spectral Efficiency of Coded CDMA Under Successive Decoding." IEEE Trans. Inform. Theory, vol. 50, No. 1, pp. 152-164. Jan. 2004.

Crisan, D. and Doucet, A., "A Survey of Covergence Results on Particle Filtering for Practitioners," IEEE Trans. Signal Process., vol. 50, No. 3, pp. 736-746, Mar. 2002.

Cui, T. and Tellambura, C., "Robust Joint Frequency Offset and Channel Estimation for OFDM Systems," IEEE Veh. Tech. Cont. 2004, vol. 1. pp. 603-007, Sep. 26-29, 2004.

Doucet, A. and Wang, X., "Monte Carlo Methods for Signal Processing," IEEE Sign. Proc. Mag., vol. 22, No. 6, pp, 152-170, Nov. 2005.

Doucet, A., Godsill, S. J., and Andrieu, C., "On Sequential Simulation-Based Methods for Bayesian Filtering," Stat. Comput., vol. 10, No. 3, pp. 197-208, 2000.

Farrokhi, F. R., Tassiulas, L., and Liu, K. J. R., "Joint Optimal Power Control and Beamforming in Wireless Networks Using Antenna Arrays," IEEE Trans. Commun., vol. 46, No. 10. pp. 1313-1324, Oct, 1998.

Fearnhead, P., "Using Random Quasi-Monte-Carlo Within Particle Filters, With Application to Financial Time Series," J. Computat. Graph. Stat., vol. 14, pp. 751-767, 2005.

Fortman, T. E., Bar-Shalom, Y., and Scheffe, M., "Sonar Tracking of Mutliple Targets Using Joint Probabilistic Data Association." IEEE J. Ocean. Eng., vol. OE-8, No. 7, pp. 173-184, Jul. 1983.

Foschni, G. J., "Layered Space-Time Architecture for Wireless Communication in a Fading Environment When Using Multi-Element Antennas." Bell Labs Tech, J., 1(2): 41-59, Oct. 1996.

Gerstner, T., and Griebel M., "Numerical Integration Using Sparse Grids," Numerical Algorithms, vol. 18. No. 4, pp. 209-232, 1998.

Gesbert, D., Shafi, M., Shiu, D. S., Smith, P. J., and Naguib, A., "From Theory to Practice: An Overview of MIMO Space-Time Coded Wireless Systems," IEEE J. Select. Areas Commun., vol. 21, No. 3, pp. 281-302, Apr. 2003.

Geweke, J., "Bayesian Inference in Econometric Models Using Monte Carlo Integration," Econometrica, vol. 57. No. 6, pp, 1317-1339, 1989.

Gordon, N. J., Saimon, D. J., and Smith. A. F. M., "A Novel Approach to Nonlinear/Non-Gaussian Bayesian State Estimation," Inst. Elect. Eng. Proc. Radar Signal Process., vol. 140, pp. 107-113, 1993.

Guo, D., and Wang, X., "Quasi-Monte Carlo Filtering in Nonlinear Dyanmic Systems," IEEE Trans. Sign. Proc., vol. 54, No. 6, pp. 2087-2098, Jun. 2006.

Guo, D., Wang, X., and Chan, R., "New Sequential Monte Carlo Methods for Nonlinear Dyanmic Systems," Stat. Comput., vol. 15, No. 2, pp. 135-147, 2005.

Handschin, J. E. "Monte Carlo Techniques for Prediction and Filtering of Nonlinear Stochastic Processes," Automatica, vol. 1970, No. 6, pp. 555-563, May 2003.

Henderson, S., Cadre, R., and Cooke, R., "Generating 'Dependent' Quasirandom Numbers," In Proc. 2000 Windter Simulation Conf., J. Joins, R. Barton, and P. Fishwick, Eds., 2000, pp. 527-536.

Hue, C., Cadre, J. and Perez, P., "Sequential Monte Carlo Methods for Multiple Target Tracking and Data Fusion," IEEE Trans. Signal Process., vol. 50, No. 2. pp. 309-325, Feb. 2002.

International Search Report and Written Opinion of the International Searching Authority, International Patent Apptication No. PCT/US2008/067546.

Ito, K. and Xiong, K., "Gaussian Filters for Nonlinear Filtering Problems," IEEE Trans. Autom. Control, vol. 45, No. 5, pp. 827-910, May 2000.

Julier, J. and Durront-Whyte, H. F., "A New MEthod for the Nonlinear Transformation of Means and Covariances in Filters and Estimators," IEEE Trans. Autom. Control, vol. 45, No. 3, pp. 477-482, Mar. 2000.

Keller, T. and Hanzo, L., "Adaptive Muiticarrier Modulation: A Convenient Framework for Time-Frequency Processing in Wireless Communications," IEEE Proc., vol. 86, No. 5, pp. 511-640, Apr. 2000.

Kotecha, J. and Djuric, P., "Gaussian Sum Particle Filtering," IEEE Trans. Signal Process., vol. 51, No. 10, pp. 2602-2612, Oct. 2003.

L'Ecuyer, P. and Lemieux, C., "recent Advanced in Randomized Quasi-Monte Carlo Methods". Boston, MA; Kluwer Academic, 2002. Modeling Uncertainty: An Examination of Stochastic Theory, Methods, and Applications.

Leung, W. K., Wu, K. Y., and Ping, Li. "Interleave-Division-Multiplexing Space-Time Codes." In Proc. 2003 IEEE Veh. Tech. Conf. (VTC'03 Spring), pp. 1094-1098, Jeju, Korea, Apr, 2003.

Li, C., Li, K., Wang, X., and Ping, L. An Interleave-Division-Multiplexing MISO System with Partial CSI at Transmitter. IEEE Trans. Veh. Tech., to appear., vol. 56, No. 3, May 2007.

Li, K. and Wang, X. "Exit Chart Analysis of Turbo Multiuser Detection," 41st Ann. Allerton Conf. Commun., Control, & Computing, Allerton, IL, USA, Oct. 2003.

Li, K., Ping, L., and Wang, X. "Analysis and Optimization of Interleave-Division Multiple-Access Communication Systems." In Proc. of IEEE Int'l Conf. on Acoust. Speech & Sig. Proc., Philadelphia, PA, Mar. 2005.

Li, S., Huang, D., Letaief, K. B., and Zhou, Z., "Multi-Stage Beamforming for Coded OFDM with Multiple Transmit and Multiple Receiver Antennas," IEEE Trans. Wireless Commun., vol. 6. No. 3, pp. 959-969, Mar. 2007.

Li. Y., Seshadri, N., and Ariyavisitakul, S., "Channel Estimation for OFDM Systems with Transmitter Diversity in Mobile Wireless Channels," IEEE J. Select. Areas Commun., vol. 17, No. 3. pp. 461-471. Mar. 1999.

Liu, J. S. and Chen, R., "Sequential Monte Carlo Methods for Dyanmic Systems," J. Amer. Statist. Assoc., vol. 93, pp. 1032-1044, 1998.

Liu, L. and Jafarkhani, H., "Successive Transmit Beamforming Algorithms for Multiple-Antenna OFDM Systems," IEEE Trans. Wireless Commun., vol. 6, No. 4, pp. 1512-1522, Apr. 2007.

Liu, Z., Xin, Y., and Giannakis, G. B., "Linear Constellation Precoding for OFDM with Maximum Multipat Diversity and Coding Gains," IEEE Trans. Commun., vol. 61, No. 3, pp. 416-427, Mar. 2003.

Marsaglia, G. and Zaman, A., "Rapid Evaluation of the Inverse of the Normal Distribution Function," Statist. Prob. Lett., vol. 19. pp, 259-266, 1994.

Mondal, B. and Heath, R. W., "Channel Adaptive Quantization for Limited feedback MIMO Beamforming Systems," IEEE Trans. Sign. Proc., vol. 54, No. 12, pp. 4717-4729, Dec. 2006.

Office Action dated Aug. 30, 2010 in U.S. Appl. No. 11/957,385.

Ormoneit, D., Lemieux. C. and Fleet. D., "Lattice Particle Filters," Proc. 17th Annu. Conf. Uncertainty in Artificial Intelligence, pp. 395-402, 2001.

Owen, A., "Monte Carlo Variance of Scrambled Net Quadrature," SIAM J. Numer. Anal., vol. 34, No. 5, pp. 1884-1910, 1997.

Pande, T., Love, D. J., and Krogmeier, J. V., "A Weighted Least Squares Approach to Precoding with Pilots for MIMO-OFDM," School of Electrical and Computer Engineering, Purdue University, Dec. 14, 2005.

Papadias, C. B. and Foschini, G. J. "Capacity-Approaching Space-Time Codes for Systems Employing Four Transmitter Antennas." IEEE Trans. Inform. Theory, 49(3): 726-733, Mar. 2003.

Papageorgiou, A., "fast Convergence of Quasi-Monte Carlo for a Class of Isotropic Integrals," Math Computat., vol. 70, No. 4, pp. 297-306, 2001.

Petras, K., "Fast Calculation of Coefficients in the Smolyak Algorithm ," Numerical Algorithms, vol. 26, No. 2, pp. 93-109, 2001.

Philomin, V., Duraiswami. R., and Davis, L. S., "Quasirandom Sampling for Condensation," in Proc. Eur. Conf. Computer Vision. 2000, pp. 134-149.

Ping, L., Leung, W. K., and Wu, K. Y. "Low-Rate Turbo-Hadamard Codes," IEEE Trans. Inform. Theory, vol. 49, No. 12, pp. 3213-3224, Dec. 2003.

Ping, L., Liu, L., Wu, K., and Lehung, W. K. "Interleave Division Multiple Access (IDMA) Communication Systems," 3rd Int'l Symp. Turbo Codes & Related Topics, pp. 173-180, Brest, france, Sep. 2003.

Price, K. and Storn, R. "Differential Evolution—A Simple and Efficient Heuristic for Global Optimization Over Continuous Spaces," J. Global Optimization, 11:341-359, 1997.

Pukkila, M., "Channel Estimation Modeling," Nokia Research Center, HUT Dec. 19, 2000.

Richardson, T., Shokrollahi, A., and Urbanke, R. "Design of Capacity-Approaching Irregular Low-Density Parity-Check Codes," IEEE Trans. Inform. Theory, vol. 47, No. 2, pp. 619-637, Feb. 2001.

Roh, J. C. and Rao, B. D., "Transmit Beamforming in Multiple-Antenna Systems with Finite Fate Feedback: A VQ-Based Approach," IEEE Trans. Inf. Theory, vol. 52, No. 3, pp. 1101-1112, Mar. 2006.

Sellathurai, M. and Haykin, S. "Turbo-BLAST for Wireless Communications: Theory and Experiments." IEEE Trans. Sig. proc., 50(10):2536-2546, Oct. 2002.

Sellathurai, M. and Haykin, S. "Turbo-BLAST: Performance Evaluation in Correlated Rayleigh-Fading Environment." IEEE J. Select. Areas Commun., 21(3):340-349, Apr. 2003.

Shahbazpanahi, S. Gershman, A. B., Luo, Z. -Q., and Wong, K. M., "Robust Adaptive Beamforming for General-Rank Signal Models," IEEE Trans. Sign. Proc., vol. 51, No. 9, pp. 2257-2269, Sep. 2003.

Shamai, S. and Verdu, S. "The Impact of Frequency-Flat Fading on the Spectral Efficientcy of CDMA," IEEE Trans. Inform. Theory, vol. 47, No. 4, pp. 1302-1327, May 2001.

Tarokh, V., Jafarkhani, H., and Calderbank. A. R. "Space-Time Block Codes from Orthogonal Designs." IEEE Trans. Inform. Theory, 45(4):1456-1467, Jul. 1999.

Tarokh, V., Jafarkhani, H., and Calderbank, A. R. "Space-Time Block Coding for Wireless Communications: Performance Results." IEEE J. Select. Areas Commun., 17(3):451-460, Mar. 1999.

Tse, D. and Hanly, S. "Linear Multiuser Receivers: Effective Interference, Effective Bandwidth and User Capacity," IEEE Trans. Inform. Theory, vol. 45, No. 2, pp. 614-657, Mar. 1999.

Tse, D. N. C., Viswanath, P., and Zheng, L., "Diversity-Multiplexing Tradeoff in Multiple-Access Channels," IEEE Trans. Inform. Theory, vol. 50, No. 9. pp. 1659-1874. Sep. 2004.

U.S. Appl. No. 12/665,684 filed Dec. 18, 2009.
U.S. Appl. No. 11/957,385 filed Dec. 14, 2007.
U.S. Appl. No. 60/875,416 filed Dec. 14, 2006.
U.S. Appl. No. 60/875,417 filed Dec. 14, 2006.

Wang, X. and Hickernell, F., "Randomized Halton Sequences," Math. Comput. Model., vol. 32. No. 4, pp. 887-899, 2000.

Wang, X. and Poor, H. V. "Iterative (Turbo) Soft Interference Cancellation and Decoding for Coded CDMA." IEEE Trans. Commun., 46(7):1045-1061, Jul. 1999.

West, M., "Mixture Models, Monte Carlo, Bayesian Updating and Dynamic Models," Comput. Sci. Stat., vol. 24, pp. 325-333, 1993.

Wu, K. Y., Leung, W. K., and Ping, Li. "A Simple Approach to Near-Optimal Multiple Transmit Antenna Space-Time Codes." In Proc. 2003 IEEE Int. Conf. Commun. (ICC'03), pp. 2603-2607, Anchorage, AK, May 2003.

Wu, K. Y., Ping, L., and Leung, W. K. "Multi-layer Turbo Space-Time Codes for High-Rate Applications," In Proc. 2004 IEEE Global Telecommun. Conf. (GLOBECOM'04), pp. 3758-3762, Dallas, TX, Dec. 2004.

Yang, H., "A Road to Future Broadband Wireless Access: MIMO-OFDM-Based Air Interface." IEEE Commun. Mag., vol. 43, No. 1, pp. 53-60, Jan. 2005.

Zuccardi Merli, F. and Vitetta, G. M., "Blind Feedfomard Frequency Estimation for OFDM Signals Transmitted Over Muitipath Fading Channels," IEEE Int. Conf. Commun., vol. 6, pp. 2881-2886. Jun. 11-15, 2006.

* cited by examiner

METHODS AND SYSTEMS FOR DIGITAL WIRELESS COMMUNICATION

CROSS REFERENCE TO RELATED APPLICATIONS

This application claims the benefit of U.S. Provisional Patent Application No. 60/875,417, filed Dec. 14, 2006, which is hereby incorporated by reference herein in its entirety.

TECHNICAL FIELD

The disclosed subject matter relates to methods and systems for digital wireless communications.

BACKGROUND

Digital wireless communication systems have gained widespread adoption in recent years. Common examples of digital wireless communication systems include wireless routers, which are frequently made according to the 802.11 standards, and mobile telephones.

A common problem with digital communication systems is multi-path fading as multiple copies of a signal propagate from a transmitter to a receiver via different paths. For example, one copy of a signal can propagate via a straight line between a transmitter and a receiver and another copy can propagate via a reflection off a structure between the transmitter and the receiver. Because the two copies of the signals are taking different paths, the copies will be out of phase when they reach the receiver. This can result in constructive or destructive interference. As a receiver moves relative to a fixed transmitter, the receiver will either pick up a stronger or weaker sum of the copies of the signal. This variation is fading in the signal.

To address multi-path fading problems, as well as other forms of signal degradation, orthogonal frequency divisional multiplexing (OFDM) has been adopted in many digital wireless systems. OFDM operates by sending digital signals across many different orthogonal subcarriers (or channels). Unlike some other forms of communication which attempt to send a large amount of data over a single carrier at high speed, OFDM spreads the data across multiple subcarriers at lower speeds. This enables OFDM systems to be more robust to interference problems.

Also to improve performance of wireless systems, multiple-input and multiple-output (MIMO) configurations have been adopted, including in OFDM systems. In a typical configuration, a MIMO system may use two or more transmit antennas and two or more receive antennas. By controlling the signals being output on these transmit antennas using block space-time coding techniques, multiple copies of the same data can be transmitted with the hopes that at least one copy will successfully be received by the receiver. One form of space-time coding is Almouti space-time coding.

In a cell configuration of MIMO transmitters, such as with mobile telephones and wireless computer networks, space-time-coded signals from two neighboring transmitters can interfere with each other, even when using Almouti coding. The interference can limit the performance of a receiver on the border between two cells.

Accordingly, it is desirable to provide mechanisms which improve digital wireless communication between two or more neighboring wireless communication cells.

SUMMARY

Methods and systems for digital wireless communication are provided. In some embodiments, methods for digital wireless communications are provided, the systems comprising: receiving a first transmitted signal that was transmitted from a first transmitter antenna, wherein the first transmitted signal contains first symbols corresponding to data interleaved by a first interleaver at a first location; receiving a second transmitted signal that was transmitted from a second antenna, wherein the second transmitted signal contains second symbols corresponding to data that is a interleaved by a second interleaver at a first location; receiving a third transmitted signal that was transmitted from a third transmitter antenna, wherein the third transmitted signal contains third symbols corresponding to data interleaved by a third interleaver at a second location; receiving a fourth transmitted signal that was transmitted from a fourth antenna, wherein the fourth transmitted signal contains fourth symbols corresponding to data interleaved by a fourth interleaver at a second location; forming a first log likelihood ratio (LLR) for the first transmitted signal using a first mean value and a first variance value; forming a second log likelihood ratio (LLR) for the second transmitted signal using a first mean value and a first variance value; forming a third log likelihood ratio (LLR) for the third transmitted signal using a third mean value and a third variance value; forming a fourth log likelihood ratio (LLR) for the fourth transmitted signal using a fourth mean value and a fourth variance value; de-interleaving the first LLR with a first de-interleaver to form a first de-interleaved LLR; de-interleaving the second LLR with a second de-interleaver to form a second de-interleaved LLR; de-interleaving the third LLR with a third de-interleaver to form a third de-interleaved LLR; de-interleaving the fourth LLR with a fourth de-interleaver to form a fourth de-interleaved LLR; summing the first de-interleaved LLR with the second de-interleaved LLR to form a first a posteriori LLR; summing the third de-interleaved LLR with the third de-interleaved LLR to form a second a posteriori LLR; determining the difference between the first a posteriori LLR and the first LLR to form a first extrinsic LLR; determining the difference between the second a posteriori LLR and the third LLR to form a second extrinsic LLR; updating the first mean value and the first variance value based on the first extrinsic LLR; and updating the third mean value and the third variance value based on the second extrinsic LLR wherein the first interleaver, the second interleaver, the third interleaver, and the fourth interleaver are different.

In some embodiment, systems for digital wireless communications are provided, the systems comprising: a digital processing device that: receives a first transmitted signal that was transmitted from a first transmitter antenna, wherein the first transmitted signal contains first symbols corresponding to data interleaved by a first interleaver at a first location; receives a second transmitted signal that was transmitted from a second antenna, wherein the second transmitted signal contains second symbols corresponding to data that is a interleaved by a second interleaver at a first location; receives a third transmitted signal that was transmitted from a third transmitter antenna, wherein the third transmitted signal contains third symbols corresponding to data interleaved by a third interleaver at a second location; receives a fourth transmitted signal that was transmitted from a fourth antenna, wherein the fourth transmitted signal contains fourth symbols corresponding to data interleaved by a fourth interleaver at a second location; forms a first log likelihood ratio (LLR) for the first transmitted signal using a first mean value and a first variance value; forms a second log likelihood ratio (LLR) for the second transmitted signal using a first mean value and a first variance value; forms a third log likelihood ratio (LLR) for the third transmitted signal using a third mean value and a third variance value; forms a fourth log likelihood ratio (LLR) for the fourth transmitted signal using a fourth mean value and a fourth variance value; de-interleaves the first LLR with a first de-interleaver to form a first de-interleaved LLR; de-interleaves the second LLR with a second de-interleaver to form a second de-interleaved LLR; de-interleaves the third LLR with a third de-interleaver to form a third de-interleaved LLR; de-interleaves the fourth LLR with a fourth de-interleaver to form a fourth de-interleaved LLR, sums the first de-interleaved LLR with the second de-interleaved LLR to form a first a posteriori LLR; sums the third de-interleaved LLR with the third de-interleaved LLR to form a second a posteriori LLR; determines the difference between the first a posteriori LLR and the first LLR to form a first extrinsic LLR; determines the difference between the second a posteriori LLR and the third LLR to form a second extrinsic LLR; updates the first mean value and the first variance value based on the first extrinsic LLR; and updates the third mean value and the third variance value based on the second extrinsic LLR, wherein the first interleaver, the second interleaver, the third interleaver, and the fourth interleaver are different.

DETAILED DESCRIPTION

Figure 1:
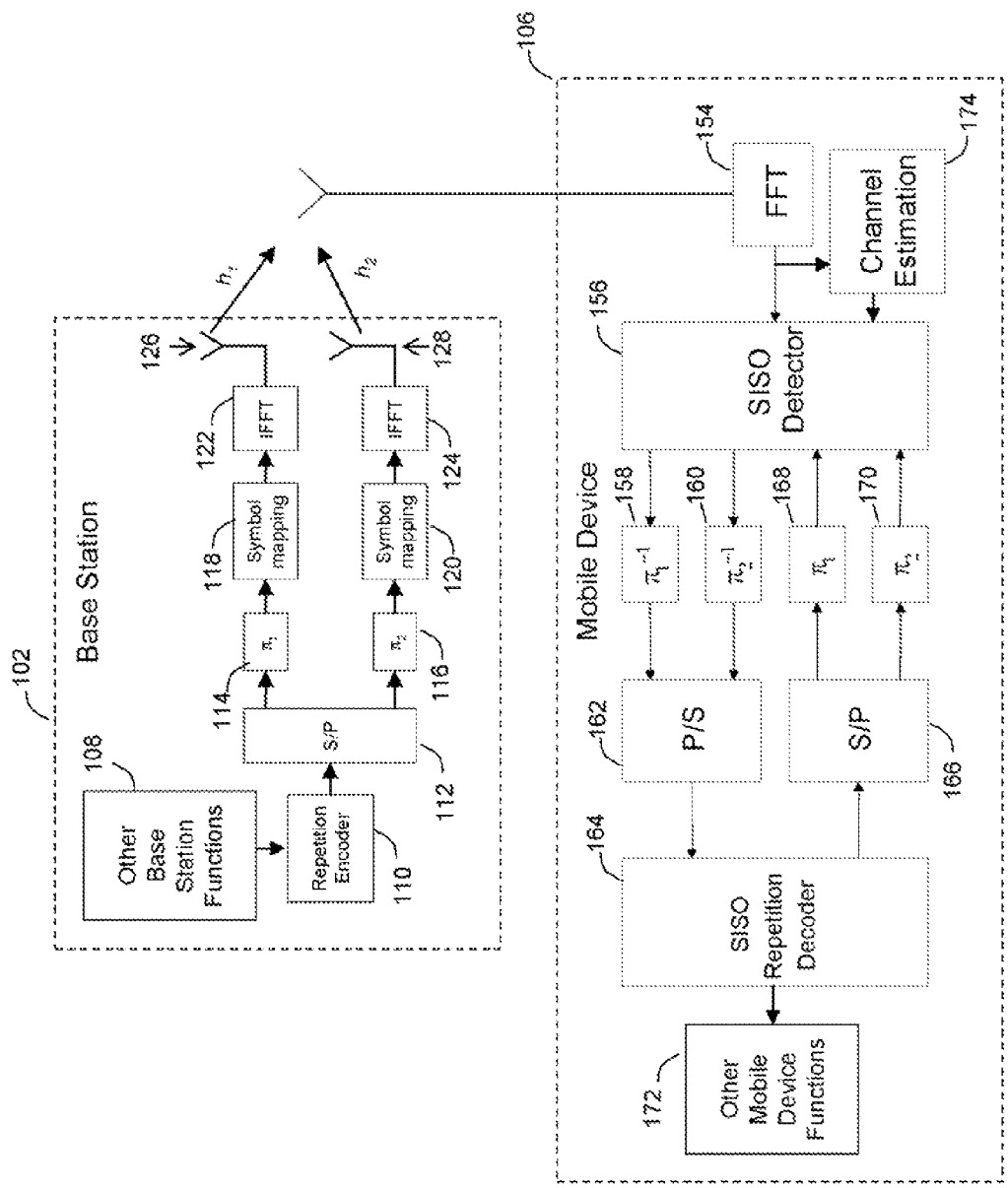
FIG. 1 is a diagram of system incorporating a base station transmitter and a mobile device receiver in accordance with some embodiments.

Turning to FIG. 1, a diagram of a system 100 in accordance with some embodiments is illustrated. As shown, system 100 includes a base station 102 and a mobile device 106.

Base station 102 includes other base station functions 108, a repetition encoder 110, a serial-to-parallel converter 112, interleavers 114 and 116, symbol mapping mechanisms 118 and 120, Inverse Fast Fourier Transform mechanisms 122 and 124, and transmitters 126 and 128. Other base station functions 108 can be any suitable functions, circuitry, etc. that generate digital data for transmission to mobile device 106. For example, functions 108 can be telephone system functions for enabling a mobile telephone implemented as mobile device 106 to connect to a telephone network. In some embodiments, other base stations functions can include channel encoders, such as turbo encoders, convolutional encoders, BCH encoders, etc. In some embodiments, repetition encoder 110, serial-to-parallel converter 112, interleavers 114 and 116, symbol mapping 118 and 120, Inverse Fast Fourier Transform mechanisms 112 and 124, and other base station functions 108 can be implemented in any suitable one or more sections of hardware. For example, these components can be implemented in a digital processing device (e.g., a microprocessor) running suitable software.

As its name suggests, repetition encoder 110 can be used to perform repetition encoding using any suitable repetition encoding algorithm. For example, repetition encoding can be implemented with a rate of ¼. As a more particular example, for a signal of +1, a ¼ repetition encoder can output +1, +1, +1, +1, for an input signal of −1, a ¼ repetition can output −1, −1, −1, −1. In some embodiments, a repetition encoder can have an output with a mean of zero. For example, for a signal of +1, a ¼ repetition encoder can have an output of +1, −1, +1, −1, and for a signal of −1, a ¼ repetition encoder can have an output of −1, +1, −1, +1.

Serial-to-parallel converter may be any suitable serial-to-parallel converter that alternates incoming bits from the repetition encoder between interleavers 114 and 116. In this way, the bits input to repetition encoder, after repetition, are spread across multiple interleavers.

Interleavers 114 and 116 can be any suitable interleavers using different interleaving patterns. For example, interleavers 114 and 116 can be random interleavers or S-interleavers, which are known in the art. While the interleaving pattern used by interleavers 114 and 116 are different, the interleavers can be of the same type.

Symbol mapping mechanisms 118 and 120 can be any suitable symbol mapping techniques. For example, Quadrature Phase Shift Keying (QPSK), Binary Phase Shift Keying (BPSK), and Quadrature Amplitude Modulation (QAM) can each be used for symbol mapping.

Inverse Fast Fourier Transform (IFFT) mechanisms 122 and 124 can be any suitable inverse Fast Fourier Transform algorithms for modulating the symbols (e.g., QPSK symbols from the symbol mapping mechanism) to be transmitted.

Transmitters 126 and 128 can be any suitable transmitters for transmitting the symbols. For example, in some embodiments, the transmitters can be OFDM transmitters. In some embodiments, transmitters 126 and 128 can include parallel-to-serial converters, cyclix prefix insertion functions, filters, digital-to-analog converters (DACs), amplifiers, and antennas as known in the art.

Mobile Device 106 can include a receiver 152, a Fast Fourier Transform mechanism 154, a channel estimation mechanism 174, a soft-input, soft-output detector 156, de-interleavers 158 and 160, a parallel-to-serial converter 162, a soft-input, soft-output decoder 164, a serial-to-parallel converter 166, interleavers 168 and 170, and other mobile device functions 172. In some embodiments, Fast Fourier Transform mechanism 154, channel estimation mechanism 174, soft-input, soft-output detector 156, de-interleavers 158 and 160, parallel-to-serial converter 162, soft-input, soft-output decoder 164, serial-to-parallel converter 166, interleavers 168 and 170, and other mobile device functions 172 can be implemented in any suitable one or more sections of hardware. For example, these components can be implemented in a digital processing device (e.g., a microprocessor) running suitable software.

Receiver 152 can be any suitable receiver for receiving the signals transmitted by transmitters 126, 128, 148, and 150. In some embodiments, receiver 152 can include an antenna, an amplifier, an analog-to-digital converter, a filter, a cyclic prefix removing function, a serial-to-parallel converter, etc. In some embodiments, the receiver can be an OFDM receiver.

Fast Fourier Transform (FFT) mechanism 154 can be any suitable Fast Fourier Transform algorithm for demodulating symbols (e.g., QPSK symbols) from the transmitted signal.

Channel estimation mechanism 174 may be any suitable mechanism for making channel estimates on the channels (e.g., $h_1$ and $h_2$) of the transmitter (e.g., the OFDM subcarriers) as is known in the art.

Soft-input, soft-output (SISO) detector 156 can be any suitable SISO detector for detecting symbols from FFT 154 and providing the Log Likelihood Ratio (LLR) of the transmitted bits (which are represented as symbols output by FFT 154). As is known in the art, an SISO detector provides an LLR value that is based on the inputs from FFT 154 as well as a priori information from a SISO decoder. SISO detector 156 can produce an LLR output according to the following equation (1):

$$\lambda_{det}(x_i) \triangleq \log\left\{\frac{p(y|x_i=+1,h)}{p(y|x_i=-1,h)}\right\} = 2h_i \frac{y - \sum_{k=1,k\neq i}^{2} h_k E\{x_k\}}{\sum_{k=1,k\neq i}^{2} |h_k|^2 \text{Var}\{x_k\} + \sigma^2} \quad (1)$$

where:
$x_i$ is the transmitted signal;
y is the received signal;
h is the vector of channel response of the OFDM subcarriers;
$h_i$ is the channel response of the OFDM subcarrier;
$p(y|x_i=+1,h)$ is the probability that the received signal contains a +1;
$p(y|x_1=-1,h)$ is the probability that the received signal contains a −1;
E{ } is a mean calculation; and
Var{ } is a variance calculation.

De-interleavers 158 and 160 can be any suitable de-interleavers that are matched to interleavers 114 and 116. That is, when mobile device 106 is communicating with base station 102, de-interleavers 158 and 160 perform the opposite of the pattern used by interleavers 114 and 116 to interleave the bits coming out of serial-to-parallel converter 112 in base station 102.

Parallel-to-serial converter 162 can be any suitable parallel-to-serial converter for receiving the outputs from de-interleavers 158 and 160 and putting them into a serial output. The LLR values from interleavers 158 and 160 are output in alternating fashion from parallel-to-serial converter 162.

Soft-input, soft-output (SISO) repetition decoder can be any suitable SISO decoder. SISO repetition decoder can receive de-interleaved LLR values from de-interleavers 158 and 160 via parallel-to-serial converter 162, and sum the LLR values to calculate an a posteriori LLR using the following equation (2):

$$\Lambda_{dec}(b) = \sum_{j=1}^{S} \lambda_{det}(x_j) \quad (2)$$

where:
b is the information bit input to the repetition encoder;
S is the number of bits output by the repetition encoder for bit b; and
$x_j$ is a bit output from the repetition encoder for b.

Based on the a posteriori LLR values and the LLR value from the SISO detector, the SISO repetition decoder can calculate extrinsic LLR values using the following equation (3):

$$\lambda_{dec}(x_i) = \Lambda_{dec}(b) - \lambda_{det}(x_i) \quad (3)$$

These extrinsic LLR values can then be put in parallel form by serial-to-parallel converter 166, interleaved by interleavers 168 and 170, and fed back to the SISO detector as a priori information used to update the mean and variance values for the LLR calculation in the detector according to the following equations (4) and (5):

$$E\{x_i\} = \tanh\left(\frac{\lambda_{dec}(x_i)}{2}\right) \quad (4)$$

$$\text{Var}\{x_i\} = 1 - \tanh^2\left(\frac{\lambda_{dec}(x_i)}{2}\right) \quad (5)$$

As can be seen, the LLR values generated by SISO detector 156 and SISO Repetition Decoder 164 loop between them via the de-interleavers, parallel-to-serial converter, serial-to-parallel converter, and interleavers. Each loop forms an iteration. After a certain number of iterations (e.g., three), the LLR values can be deemed to be accurate. At this point, the SISO repetition decoder can output a hard data bit. In some embodiments, this hard data bit can simply be the sign of the a posteriori LLR. That is, the hard data bit can be calculated by equation (6):

$$\text{hard data bit} = \text{sign}(\Lambda_{dec}(b)) \quad (6)$$

This hard data bit can then be used in any suitable manner by other mobile device functions 172.

As mentioned above, serial-to-parallel converter 166 and interleavers 168 and 170 can provide a feed back loop between the SISO repetition decoder and the SISO detector. Serial-to-parallel decoder 166 can be any suitable decoder. Interleavers 168 and 170 can be any suitable interleavers that match the interleaver patterns of interleavers 114 and 116.

Other mobile device functions 172 can be any suitable functions, circuitry, etc. that use data transmitted from base station 102. For example, other mobile device function 172 can include mobile phone circuitry. In some embodiments, other mobile device functions 172 can include channel decoding functions, such as turbo decoders, convolutional decoders, BCH decoders, etc.

SISO detectors and SISO repetition decoders are discussed further in Kai Li and Xiaodong Wang, "Analysis and Optimization of Interleave-Division Multiple Access Communication Systems," IEEE ICASSP 2005, pp. III-917-20, 2005, which is hereby incorporated by reference herein in its entirety.

In some embodiments, when QPSK symbol mapping is used (i.e., at symbol mapping mechanisms 118 and 120), the real part and the imaginary part of the received signal ($y_R$ and $y_I$) can be processed separately and in the same way as described above for y in equations (1)-(5).

Figure 2:
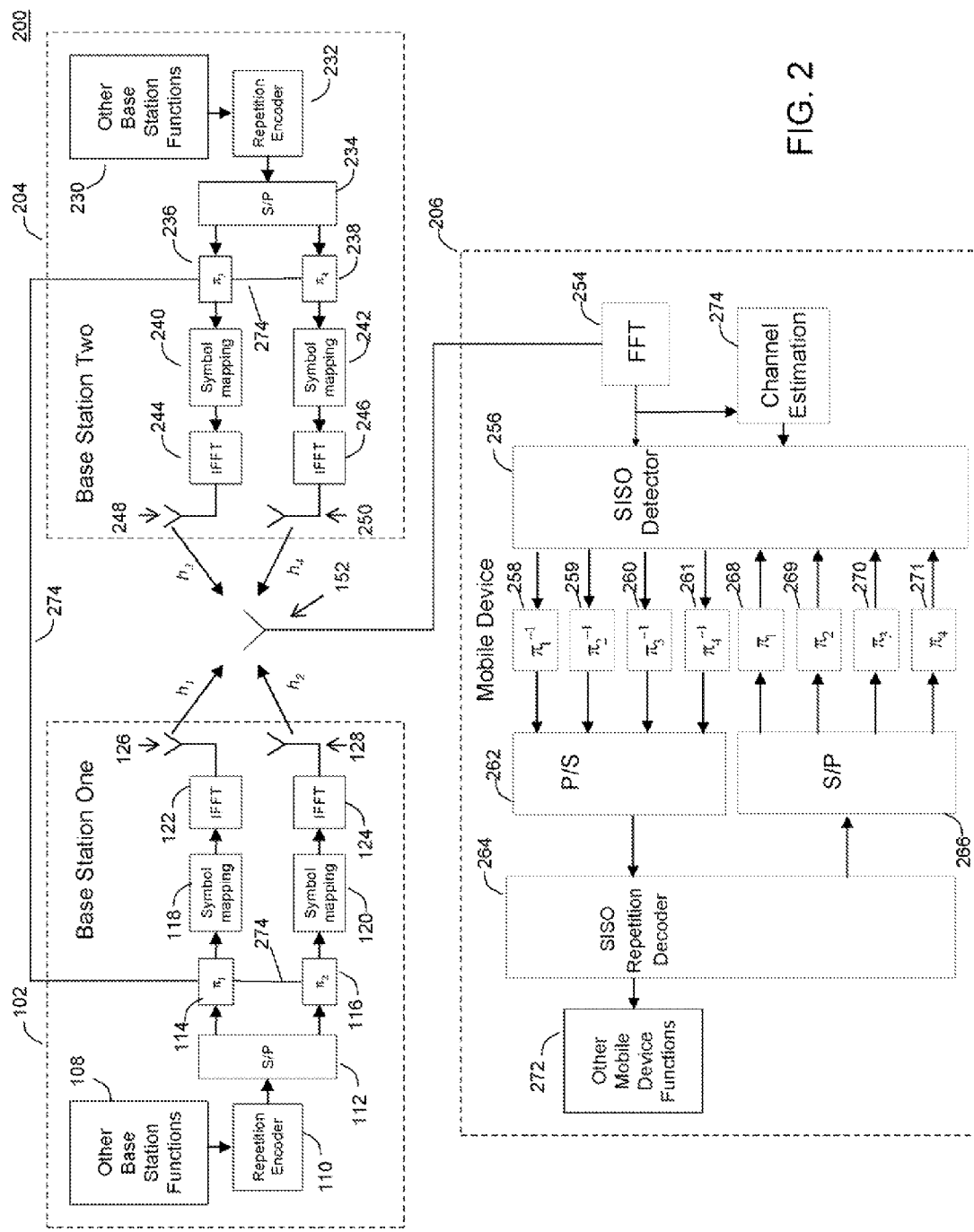
FIG. 2 is a diagram of system incorporating two base station transmitters and a mobile device receiver in accordance with some embodiments.

In some embodiments, two base stations can have signals received by a mobile device. FIG. 2 illustrates a system 200 with two base stations 102 and 204 and a mobile receiver 206. Base station 102 can contain substantially the same components as illustrated in FIG. 1. Base station 204 can contain substantially the same components as base station 102, except that base station 204 have different interleavers than base station 102. As with interleavers 118 and 120, the type of interleavers in base station 204 can be the same as that in base station 102, but the interleaving pattern are different. Also, as shown, in some embodiments, base stations 102 and 204 can communicate via a path 274 to coordinate their interleaver patterns so that they are distinct. Path 274 can be any suitable communication path such as a hard wire, a wireless connection, the Internet, telephone systems, microwave systems, satellite systems, etc. Mobile device 206 can contain substantially the same components as illustrated in mobile device 106 of FIG. 1 except that device 206 contains twice as many de-interleavers and interleavers.

In one example, base station 102 is communicating with mobile device 206 and base station 204 is creating interference. This can be the case because mobile device is on the border of the areas covered by the two base stations. In this case, the generation of the signals by the base stations and the receipt and processing of the signals by the mobile device is the same as described above in connection with FIG. 1, except that there are more signals—e.g., the signals passing through each of the de-interleavers and interleavers in the mobile device. Because the mobile device is able to identify which bits output by SISO repetition decoder 264 into other mobile device functions 272, the mobile device can distinguish signals generated by base station 102 versus base station 204.

Although FIG. 1 has been illustrated with two interleavers, and FIG. 2 has been illustrated with four de-interleavers and four interleavers, each configuration can use any suitable number of these components, and the functions of the other components modified accordingly. Similarly, although FIG. 2 only illustrates two base stations, any suitable number of base stations can be present.

While FIGS. 1 and 2 have been illustrated in describing base stations 102 and 204 as base stations, in some embodiments, mobile devices or any other devices can be implemented using the components of 102 and 204. Similarly, although mobile devices 106 and 206 are illustrated as being mobile devices, in some embodiments, base stations or any other devices can be implemented using the components of 106 and 206.

In some embodiments, to support high-rate transmission, a multi-layer IDM scheme can be employed. In such a scheme, different power levels can be allocated for different layers so that at the receiver the layer with higher power converges faster than the layer with lower power. Once the higher power layer converges, the interference it causes with to other layers becomes smaller, which in turn helps the other layers converge faster.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for digital wireless communications, comprising:
   receiving a first transmitted signal that was transmitted from a first transmitter antenna, wherein the first transmitted signal contains first symbols corresponding to data interleaved by a first interleaver at a first location;
   receiving a second transmitted signal that was transmitted from a second transmitter antenna, wherein the second transmitted signal contains second symbols corresponding to data that is a interleaved by a second interleaver at the first location;
   receiving a third transmitted signal that was transmitted from a third transmitter antenna, wherein the third transmitted signal contains third symbols corresponding to data interleaved by a third interleaver at a second location;
   receiving a fourth transmitted signal that was transmitted from a fourth transmitter antenna, wherein the fourth transmitted signal contains fourth symbols corresponding to data interleaved by a fourth interleaver at the second location;
   forming a first log likelihood ratio (LLR) for the first transmitted signal using a first mean value and a first variance value;
   forming a second log likelihood ratio (LLR) for the second transmitted signal using a second mean value and a second variance value;
   forming a third log likelihood ratio (LLR) for the third transmitted signal using a third mean value and a third variance value;
   forming a fourth log likelihood ratio (LLR) for the fourth transmitted signal using a fourth mean value and a fourth variance value;
   de-interleaving the first LLR with a first de-interleaver to form a first de-interleaved LLR;
   de-interleaving the second LLR with a second de-interleaver to form a second de-interleaved LLR;
   de-interleaving the third LLR with a third de-interleaver to form a third de-interleaved LLR;
   de-interleaving the fourth LLR with a fourth de-interleaver to form a fourth de-interleaved LLR;
   summing the first de-interleaved LLR with the second de-interleaved LLR to form a first a posteriori LLR;
   summing the third de-interleaved LLR with the fourth de-interleaved LLR to form a second a posteriori LLR;
   determining the difference between the first a posteriori LLR and the first LLR to form a first extrinsic LLR;
   determining the difference between the second a posteriori LLR and the third LLR to form a second extrinsic LLR;
   updating the first mean value and the first variance value based on the first extrinsic LLR; and
   updating the third mean value and the third variance value based on the second extrinsic LLR,
   wherein the first interleaver, the second interleaver, the third interleaver, and the fourth interleaver are all different.

2. The method of claim 1, wherein the first de-interleaver has a different de-interleaver pattern from the second de-interleaver.

3. The method of claim 1, further comprising converting a parallel receipt of the first de-interleaved LLR and the second de-interleaved LLR into a serial output.

4. The method of claim 1, further comprising interleaving the first extrinsic LLR using an interleaver having an interleaver pattern that is the same as the first interleaver to form a first interleaved extrinsic LLR.

5. The method of claim 4, wherein updating the first mean value and the first variance value uses the first interleaved extrinsic LLR.

6. The method of claim 1, where in the first symbols are QPSK symbols.

7. The method of claim 1, further comprising generating a hard data bit from the sign of the first a posteriori LLR.

8. A system for digital wireless communications, comprising:
   a digital processing device that:
      receives a first transmitted signal that was transmitted from a first transmitter antenna, wherein the first transmitted signal contains first symbols corresponding to data interleaved by a first interleaver at a first location;
      receives a second transmitted signal that was transmitted from a second transmitter antenna, wherein the second transmitted signal contains second symbols corresponding to data that is a interleaved by a second interleaver at the first location;
      receives a third transmitted signal that was transmitted from a third transmitter antenna, wherein the third transmitted signal contains third symbols corresponding to data interleaved by a third interleaver at a second location;
      receives a fourth transmitted signal that was transmitted from a fourth transmitter antenna, wherein the fourth transmitted signal contains fourth symbols corresponding to data interleaved by a fourth interleaver at the second location;

forms a first log likelihood ratio (LLR) for the first transmitted signal using a first mean value and a first variance value;
forms a second log likelihood ratio (LLR) for the second transmitted signal using a second mean value and a second variance value;
forms a third log likelihood ratio (LLR) for the third transmitted signal using a third mean value and a third variance value;
forms a fourth log likelihood ratio (LLR) for the fourth transmitted signal using a fourth mean value and a fourth variance value;
de-interleaves the first LLR with a first de-interleaver to form a first de-interleaved LLR;
de-interleaves the second LLR with a second de-interleaver to form a second de-interleaved LLR;
de-interleaves the third LLR with a third de-interleaver to form a third de-interleaved LLR;
de-interleaves the fourth LLR with a fourth de-interleaver to form a fourth de-interleaved LLR;
sums the first de-interleaved LLR with the second de-interleaved LLR to form a first a posteriori LLR;
sums the third de-interleaved LLR with the fourth de-interleaved LLR to form a second a posteriori LLR;
determines the difference between the first a posteriori LLR and the first LLR to form a first extrinsic LLR;
determines the difference between the second a posteriori LLR and the third LLR to form a second extrinsic LLR;
updates the first mean value and the first variance value based on the first extrinsic LLR; and
updates the third mean value and the third variance value based on the second extrinsic LLR,
wherein the first interleaver, the second interleaver, the third interleaver, and the fourth interleaver are different.

9. The system of claim 8, wherein the first de-interleaver has a different de-interleaver pattern from the second de-interleaver.

10. The system of claim 8, wherein the digital processing device also converts a parallel receipt of the first de-interleaved LLR and the second de-interleaved LLR into a serial output.

11. The system of claim 8, wherein the digital processing device also interleaves the first extrinsic LLR using an interleaver having an interleaver pattern that is the same as the first interleaver to form a first interleaved extrinsic LLR.

12. The system of claim 11, wherein updating the first mean value and the first variance value uses the first interleaved extrinsic LLR.

13. The system of claim 8, where in the first symbols are QPSK symbols.

14. The system of claim 8, wherein the digital processing device also generates a hard data bit from the sign of the first a posteriori LLR.

* * * * *